(12) United States Patent
Fritz et al.

(10) Patent No.: US 10,137,823 B2
(45) Date of Patent: Nov. 27, 2018

(54) EXTERIOR REARVIEW DEVICE WITH ILLUMINATION FUNCTIONS

(71) Applicant: SMR Patents S.à.r.l., Luxembourg (LU)

(72) Inventors: Daniel Fritz, Stuttgart (DE); Ilka Rötzer, Denkendorf (DE); Eugen Meier, Ditzingen (DE); Oliver Schmidt, Stuttgart (DE); Romeo Wieczorek, Esslingen (DE); Andrea König, Esslingen (DE); Peter Hein, Denkendorf (DE); Alexandru Dobrete, Stuttgart (DE); Andreas Herrmann, Winnenden-Baach (DE); Christopher Moase, South Brighton (AU); Adam Di Fiore, Underdale (AU); Phillip McKenzie, Clapham (AU); Marco Cid, Coromandel Valley (AU); Simon Belcher, South Plympton (AU)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/391,026

(22) Filed: Dec. 27, 2016

(65) Prior Publication Data
US 2017/0106783 A1  Apr. 20, 2017

Related U.S. Application Data (63) Continuation-in-part of application No. 14/129,559, filed as application No. PCT/EP2012/062360 on Jun. 26, 2012, now Pat. No. 9,527,431.

(30) Foreign Application Priority Data

Jun. 29, 2011 (DE) .................. 10 2011 105 983

(51) Int. Cl.
*B60Q 1/12* (2006.01)
*B60Q 1/08* (2006.01)
(Continued)

(52) U.S. Cl.
CPC .............. *B60Q 1/08* (2013.01); *B60Q 1/0011* (2013.01); *B60Q 1/0017* (2013.01); *B60Q 1/085* (2013.01);
(Continued)

(58) Field of Classification Search
CPC ............ H05B 33/0845; H05B 33/0857; H05B 37/0227; B60C 1/08; B60C 1/0011;
(Continued)

(56) References Cited

U.S. PATENT DOCUMENTS 2,561,582 A  7/1951 Marbel
2,595,331 A  5/1952 Calihan et al.
(Continued)

FOREIGN PATENT DOCUMENTS

CN  101780787 A  7/2010
DE  19637459 A1  3/1997
(Continued)

OTHER PUBLICATIONS

International Search Report and Written Opinion, Application No. PCT/EP2012/062360, dated Jan. 16, 2014.

*Primary Examiner* — Don Le
(74) *Attorney, Agent, or Firm* — MacMillan, Sobanski & Todd, LLC (57) ABSTRACT

An adaptive cornering light system for a motor vehicle includes an exterior mirror head, housing at least one lighting module that having a plurality of LEDs arranged in sectors to provide different lighting functionalities. One LED or light sector is provided for adaptively illuminating a cornering area that extends along the side of the vehicle (Continued)

toward the front of the exterior mirror head. This "cornering LED" is adaptively activated if the speed of the vehicle is below a threshold speed, or in response to additional optional parameters such as steering angle, turn-signal blinker activation, and running lights activation. Another LED or light sector may be used as a security light to illuminate or display a message on the ground in the door area adjacent the side of the vehicle. Interior lights are also disclosed. User input may also control options for illumination.

21 Claims, 4 Drawing Sheets

(51) Int. Cl.
```
B60Q 1/00      (2006.01)
B60Q 1/24      (2006.01)
B60Q 1/26      (2006.01)
B60Q 1/34      (2006.01)
H05B 37/02     (2006.01)
H05B 33/08     (2006.01)
F21S 43/235    (2018.01)
F21S 43/30     (2018.01)
F21S 41/141    (2018.01)
F21S 43/14     (2018.01)
B60Q 3/20      (2017.01)
F21Y 115/10    (2016.01)
```
(52) U.S. Cl.
CPC .......... *B60Q 1/12* (2013.01); *B60Q 1/24* (2013.01); *B60Q 1/2665* (2013.01); *B60Q 1/2696* (2013.01); *B60Q 1/34* (2013.01); *B60Q 3/20* (2017.02); *F21S 41/141* (2018.01); *F21S 43/14* (2018.01); *F21S 43/235* (2018.01); *F21S 43/30* (2018.01); *H05B 33/0845* (2013.01); *H05B 33/0857* (2013.01); *H05B 37/0227* (2013.01); *B60Q 2300/112* (2013.01); *B60Q 2300/122* (2013.01); *B60Q 2300/21* (2013.01); *F21Y 2115/10* (2016.08)

(58) Field of Classification Search
CPC ......... B60C 1/0017; B60C 1/085; B60C 1/12; B60C 1/24; B60C 1/2665; B60C 1/2696; B60C 1/34; B60C 3/02; F21S 48/115; F21S 48/2225; F21S 48/23
USPC .......................................................... 315/77
See application file for complete search history.

(56) References Cited

U.S. PATENT DOCUMENTS

| | | |
|---|---|---|
| 4,733,333 A | 3/1988 | Shibata et al. |
| 5,428,512 A | 6/1995 | Mouzas |
| 5,499,169 A | 3/1996 | Chen |
| 6,049,271 A | 4/2000 | Chu |
| 6,106,140 A | 8/2000 | Krummer et al. |
| 6,250,784 B1 | 6/2001 | Kayama |
| 6,561,685 B2 | 5/2003 | Weber et al. |
| 6,769,798 B2 | 8/2004 | Mishimagi |
| 7,175,321 B1 | 2/2007 | Lopez |
| 7,255,464 B2 | 8/2007 | Rodriguez Barros et al. |
| 8,080,941 B2 | 12/2011 | Takata |
| 8,080,942 B2 | 12/2011 | Heider et al. |
| 8,333,492 B2* | 12/2012 | Dingman ............. B60Q 1/2665 362/399 |
| 8,382,351 B2 | 2/2013 | Ishikawa et al. |
| 8,764,256 B2 | 7/2014 | Foote et al. |
| 9,283,819 B2 | 3/2016 | Salter et al. |
| 9,321,395 B2 | 4/2016 | Ammar et al. |
| 2002/0089418 A1 | 7/2002 | Shy |
| 2003/0147247 A1 | 8/2003 | Koike |
| 2004/0114384 A1* | 6/2004 | Carter ................. B60Q 1/2665 362/494 |
| 2004/0151004 A1 | 8/2004 | Shih |
| 2005/0117364 A1 | 6/2005 | Rennick et al. |
| 2005/0174792 A1 | 8/2005 | Matsuura |
| 2006/0145825 A1 | 7/2006 | Mc Call |
| 2006/0146555 A1 | 7/2006 | Inaba |
| 2007/0091634 A1 | 4/2007 | Sakurada |
| 2008/0212189 A1* | 9/2008 | Baur ................. B32B 17/10174 359/604 |
| 2009/0013922 A1 | 1/2009 | Lin |
| 2010/0053919 A1 | 3/2010 | Bonnet et al. |
| 2010/0085147 A1 | 4/2010 | McCall |
| 2010/0182143 A1* | 7/2010 | Lynam ................. B60R 1/1207 340/465 |
| 2010/0185341 A1 | 7/2010 | Wilson et al. |
| 2011/0027367 A1 | 2/2011 | Graeber et al. |
| 2011/0128141 A1 | 6/2011 | Purks et al. |
| 2012/0229882 A1* | 9/2012 | Fish, Jr. ................. B60R 1/025 359/267 |
| 2012/0280528 A1 | 11/2012 | Dellock et al. |
| 2015/0081169 A1 | 3/2015 | Pisz |
| 2016/0042150 A1 | 2/2016 | Moloughney |
| 2016/0046289 A1 | 2/2016 | Elbs |

FOREIGN PATENT DOCUMENTS

| | | |
|---|---|---|
| DE | 102006039182 A1 | 3/2008 |
| DE | 102007000371 A1 | 3/2008 |
| DE | 102006048503 A1 | 4/2008 |
| DE | 102008005702 A1 | 7/2009 |
| DE | 102010007848 A1 | 9/2010 |
| DE | 202014105473 U1 | 11/2014 |
| EP | 1304260 A1 | 4/2003 |
| EP | 1916154 A1 | 4/2008 |
| EP | 2221219 A1 | 8/2010 |
| EP | 2740632 A1 | 6/2014 |
| GB | 2530852 A | 4/2016 |
| JP | H06298003 A | 10/1994 |
| RU | 143731 U1 | 7/2014 |
| WO | 2007/122544 A1 | 11/2007 |
| WO | 2008/137634 A1 | 11/2008 |
| WO | 2015/090330 A1 | 6/2015 |
| WO | 2016/012651 A1 | 1/2016 |

* cited by examiner

Fig. 6

EXTERIOR REARVIEW DEVICE WITH ILLUMINATION FUNCTIONS

This application is a continuation-in-part of U.S. application Ser. No. 14/129,559, pending, which is a section 371 national stage of PCT/EP2012/062360, which claims priority to DE 10 2011 105983.4 filed 29 Jun. 2011. There are various systems available today for adaptive lighting of a vehicle. These systems seek to provide dynamic front-lighting, or curve lighting functionality, for a vehicle.

BACKGROUND OF THE INVENTION

The systems that are currently available typically use mechanical systems to provide the curve lighting functionality. For example, motors, such as stepper motors, may rotate a lens, a reflector, a mount, or a light source of a headlamp, or an entire light module. The stepper motors may receive signals to steer the light beam in horizontal and/or vertical directions. A particular steering angle of the light beam may be defined as a function of vehicle speed and steering wheel angle. In addition, a typical range of rotation of the light beam may be ±15 degrees left/right and ±15 degrees up/down. As a result, a roadway may be more effectively illuminated by the curve lighting functionality, thereby increasing safety and comfort.

The Patent Application DE 10 2006 039 182 A1 describes a vehicle having a light radiating device with two or more LED segments, and a control device to vary the emitted radiation intensity of the LED segments.

An adaptive front-lighting system that is referred to as "Pixel Light" has also been proposed. In this system, micro mirror devices each reflect one pixel of a light beam. Further, the light beam is fixed in place but can be programmed to suit the conditions in front of a vehicle. PCT International Published Patent Application No. PCT/IB2007/051355 describes a system that places a liquid crystal element in front of a light source in order to steer the light beam.

A system having at least one semiconductor light source is known from EP 2221219, said semiconductor light source being integrated in a specified position in a daytime running light module of the vehicle. This means that the at least one semiconductor light source is arranged in the daytime running light module in a fixed or stationary position. In order to produce the curve light and/or deflecting light function, the at least one semiconductor light source is not rotated or pivoted, but remains connected to the vehicle.

All of the known solutions for active curve lighting have the disadvantage that an area to the side of the vehicle cannot be illuminated due to the mounting position of the headlamp.

US 2012/0081915 to Foote, et al, discloses a vehicle exterior mirror having auxiliary lighting modules used optionally for various lighting functions including, for example, a turn signal indication of intent to turn, additional front and side lighting in the event of a turning steering angle or turn signal activation, reverse lighting in the event of engaging reverse gear, and a security or "puddle" light directed downwardly adjacent the side of the vehicle. In some variations, a user may exert some control over the lighting modules or functions via dashboard controls or by use of a key or remote key fob.

US 2011/273671 to Chu discloses a projector for lighting a vehicle side or displaying a "sign" adjacent the vehicle. In one embodiment, the projector is located on a side-view mirror. The projector is turned on to project a sign on the ground in an area beside the vehicle 4 and light up the area, with the door closed. The sign is determined by the pattern or mask integrated within the projector.

EP2740632 discloses a lateral rearview mirror system for a vehicle and a corresponding application program product for operating the lateral rearview mirror system. The rearview system comprises a projector such as a laser beamer for projecting an image to the environment of the vehicle. This way, an enhanced visual presentation and communication of information is achieved.

The present invention seeks to overcome problems associated with this and other prior art, by also using additional lighting in the exterior mirror, which may be adaptively controlled.

SUMMARY OF THE INVENTION

In a first aspect, the invention relates to a vehicle exterior rearview system comprising:

a housing adapted for mounting to an exterior side of a vehicle, the housing holding at least one of a reflective mirror surface and a display screen for displaying to a driver an image of the area to the side and rear of the vehicle;

one or more lighting modules disposed in said housing and providing at least one first lighting sector for implementing a turn-signal indicator and at least one second lighting sector for implementing one or more of an adaptive cornering light illuminating a forward sector or an adaptive security light illuminating a downward and rearward sector; and a control system for (a) receiving input data about vehicle status parameters from vehicle status sensors, (b) receiving input data about the vehicle's environment conditions from environmental sensors; and (c) adaptively activating the second lighting sector in response to the input data.

The vehicle exterior rearview system may have a lighting module that contains a plurality of LEDs for providing different lighting functions in several directions, or it may have a single LED or light source that is directed to multiple locations via light guides or optical fibers. The lighting sector functions that may be achieved by the various lighting modules may include a turn signal blinker light, and adaptive cornering light, a daytime running light, a security light, a reverse gear indications, side marker lights, an interior light, or any combination of these.

The exterior rearview system may light functions that are adaptive in nature, and are displayed automatically and passively in response to data input received from environmental or vehicle sensors. Alternatively, certain lighting functions, including the security light function, may displays illumination or a message responsive to data input received from a user input device. Suitable user input devices may include a key, a remote key fob, or a smartphone or tablet device. The user may thus control at least one of color, shape, intensity, and timing of lights activated for the security light function in response to user input.

In other aspects, the invention includes a light module plus means for illuminating, as defined herein, comprising
 one light source and light guides such as optical fibers and/or
 a plurality of light emitters
 to direct light to various spots and/or in various colors and/or with various brightness,
 outside and/or inside the vehicle and/or
 to illuminate the ground through rocker panel, bumper, side-camera housing . . .

for providing logo, messages/alerts, light patterns, keyboard (for opening the car), spot light on user when moving (illuminating path at night).

In other aspects, the invention includes a Control system, as defined herein that:

receives input data from user (customer/driver) via smartphone (app) or other interface;

generates messages/light patterns depending on user identity, daytime, weather conditions . . . ; and/or receives signals from sensor detecting gestures, movement and/or identity of user(s) (pictures detection, detection of key, phone . . . ), weather condition, approaching objects, etc.;

BRIEF DESCRIPTION OF THE DRAWINGS

The invention will now be explained by means of example embodiments with reference to the drawings, wherein.

DETAILED DESCRIPTION OF THE INVENTION

Reference to a "first" or a "second" or a "third" element, such as in connection with a first and second lighting sector or light function, is not intended to imply any order, but is simply a label to distinguish one from another.

Figure 1:
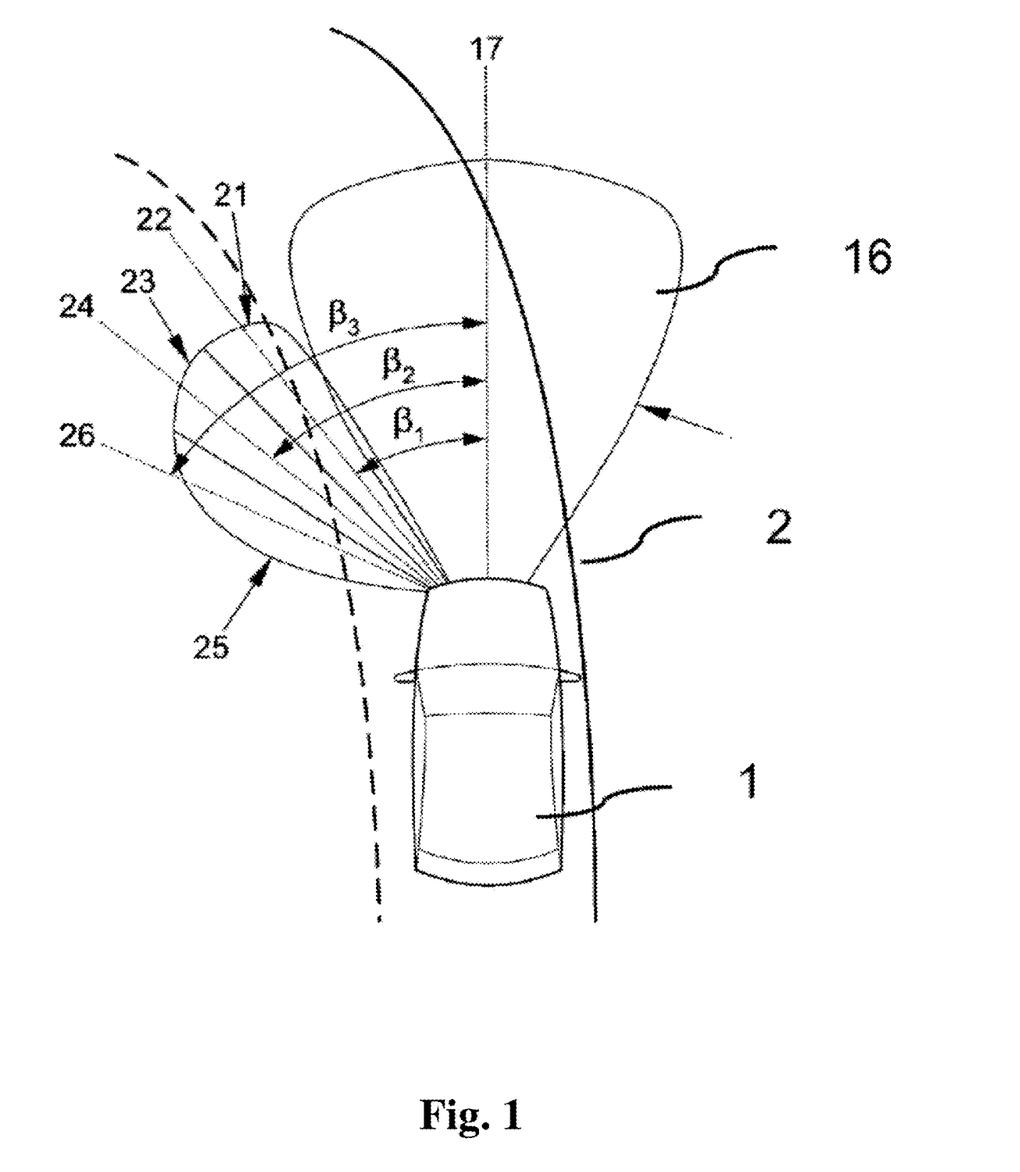
FIG. 1 is a schematic top view of a lighting distribution using a system for electronic adaptive front-lighting of a vehicle.

FIG. 1 shows a schematic top view of a lighting distribution using a system for electronic adaptive front-lighting of a vehicle. This figure illustrates a driving situation in which the vehicle 1 is driving along a roadway 2 curving towards the left. In addition, this figure illustrates an example embodiment of an electronic adaptive front-lighting system LED module in the headlamp with three different light sectors L1, L2, L3. As used herein, "adaptive" lighting or "adaptively controlled" refers to lighting that changes passively in response to a measured parameter or external stimulus, but not in direct response to control by a user. For example, in the adaptive headlamps mentioned herein, the headlamps change their angle in response to a steering angle change, not in direct response to a user's actions, even though the user is responsible for changing the steering angle by turning a steering wheel. The primary objective of the user is to steer the vehicle and only by a secondary passive or "adaptive" feature do the headlamps turn as well.

As shown in FIG. 1, the low-beam light source projects a standard light distribution 16 having a center axis 17 forward of the vehicle. In addition, the light sectors L1, L2, L3 project beams of light having illumination distributions 21, 23, 25, and having center axes 22, 24, 26 of said distributions 21, 23, and 25, respectively, at angles β1, β2, β3, respectively, from the center axis 17 of the standard light distribution 16. The light distributions 21, 23, 25 illuminate areas forward and to the left of the vehicle for the driving situation in which the vehicle is driving along a roadway curving towards the left.

Each of the light sectors L1, L2, L3 may be illuminated by one or more LEDs, based on the LED type and the amount of light required for each sector. In addition, the light intensity of each of the light sectors may be independently controlled. In this manner, the light distributions 16, 21, 23, 25 may be optimally controlled based on a particular driving situation, such as a vehicle speed, a steering wheel angle, a proximity to other vehicles, a selected driving comfort/behavior pre-programmed, an actuation of an input device such as a switch or any other human-machine interface, or road characteristics such as curvature or width, etc.

Figure 2:
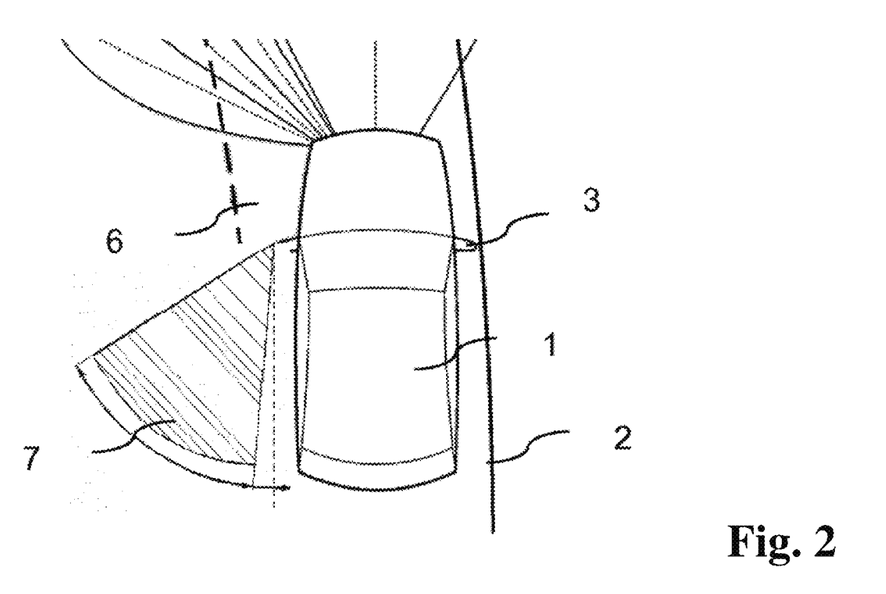
FIG. 2 illustrates the illumination distribution areas of a vehicle.
Figure 3:
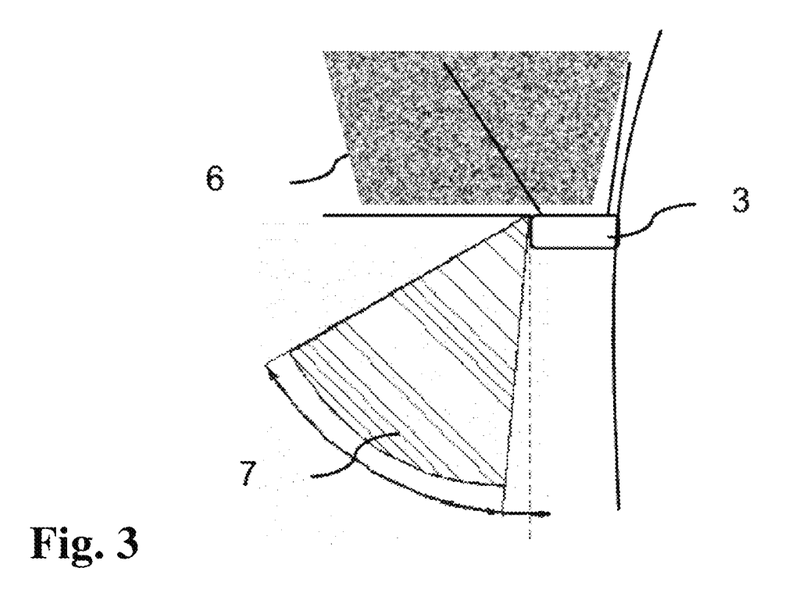
FIG. 3 illustrates an example embodiment of the illumination distribution areas of the adaptive cornering light according to the invention.

FIG. 2 illustrates the area to the left alongside the vehicle 1. Exterior rearview devices 3 are arranged on both sides of the vehicle. The rearview devices 3 comprise one or both of a mirror and a display screen. The rearview devices 3 further include turn-signal blinkers which illuminate the shaded area 7, which extends in a rearward quadrant between 5 degrees from the longitudinal axis of the vehicle and 55 degrees away from it. This illumination may be achieved with the lights or LEDs for outboard light sector L5 (see FIG. 4).

The entire area between the illuminated distributions 16, 21, 23 and 25 of the headlamps is not lit up. However, if the vehicle wants to turn, the adaptive feature of the headlamps is not adaptive enough to light up the area of the roadway immediately adjacent to the vehicle side (e.g. area 6). For this purpose, a further light source for light sector L4 is used in the exterior rearview device 3. This light sector L4 illuminates an area 6 which extends at least outwardly from the extension of the exterior mirror or display device 3 to the bodywork contour adjacent the side of the vehicle in front of the rearview device 3.

Figure 4:
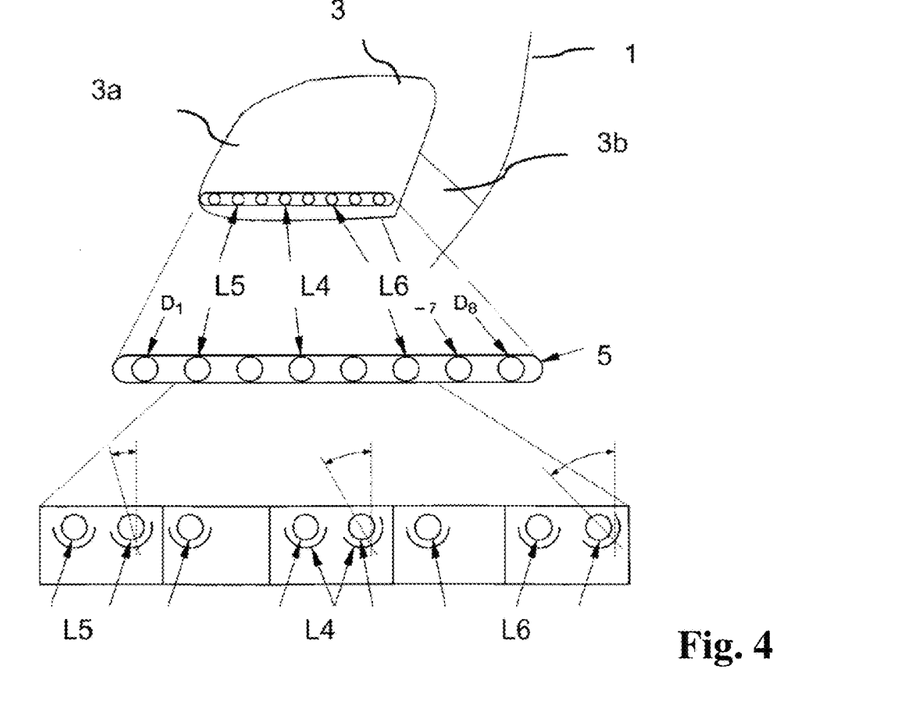
FIG. 4 illustrates the lighting in accordance with the invention.

FIG. 4 illustrates an example embodiment of an external rearview device 3 for adaptive lighting of a vehicle. The rearview device 3, in this example, consists of a mirror head 3a, which comprises a reflecting element on its side which is not visible in the drawing, and a mirror base 3b with which the exterior mirror is mounted on the vehicle 1. The vehicle 1 is indicated in the drawing with a sketched contour. The exterior mirror 3 contains a lighting module 5 which, in this example, extends along the longitudinal axis of the exterior mirror, which leads away from the vehicle. In this example embodiment, the lighting module 5 may include a turn-signal blinker, a side marker light source, an integrated daytime running light (DRL) and an adaptive cornering light.

As shown in this example embodiment, the integrated daytime running light (DRL), the turn-signal blinker, and the adaptive cornering light include LEDs D1 to D8 arranged to also provide light sectors L4, L5, and L6. The light sectors L4, L5, L6 contain LEDs, in order to illuminate areas forward and to the left of the vehicle mirror for the driving situation in which the vehicle is driving along a roadway curving towards the left. In this example embodiment, the functional light sectors L4 to L6 may each share the same LED location (i.e. D1 to D8) as the functional daytime running lights. As shown in FIG. 4, light sector L5 (e.g. which may provide the turn-signal function in some embodiments) shares the same location as daytime running light LED D2; light sector L4 (e.g. which may provide the adaptive cornering light function in some embodiments) shares the same location as daytime running light LED D4, and light sector L6 shares the same location as daytime running light LED D6, and may provide this functionality.

Further, FIG. 4 schematically illustrates optical elements as semicircular elements. The optical elements are utilized to direct the light of each DRL LED and each cornering light LED in a particular direction. The optical elements include reflectors, lenses, etc. It should be understood that the lighting module 5 is not limited to the illustrated example embodiment. The number of light sectors Lx may be varied, and the arrangement of the light sectors Lx may also be varied, such as horizontally, vertically, diagonally, in a straight line, in a curved line, etc.

Furthermore, for any given light functionality (such as turn signal blinker, adaptive cornering light, daytime running light (DRL), side marker light, reverse gear indication, or security ground light) the illumination may be supplied by one or more LEDs or light sources, depending on the complexity desired. If a single light source is used for any given light functionality, the light may be distributed more evenly and broadly by the use of elements such as diffusers, lenses, optical fibers, light guides or wave guides, and/or reflectors. This has a benefit of simpler manufacturing and maintenance of light sources like LEDs, and can still accomplish color and/or intensity variations at the output by means of filters, lenses, or diffusers.

In another embodiment, the lighting module 5 in mirror 3 only contains a turn-signal blinker and an adaptive cornering light. As a result, only two light sectors are defined, but both may, in each case, contain light sources for the other function respectively. Since the blinking function must emit amber-colored light, the LEDs which perform the blinking function are provided only for this specific function.

In addition to the arrangement and sufficient number of LEDs for the different functions, the control system for using the adaptive cornering light in the rearview device is important. Since it only makes sense to use the cornering light during sharp turning maneuvers in dim lighting situations, it is expedient to couple the activation of the adaptive cornering light with environmental and vehicle parameters and, in particular, with the daylight levels and vehicle speed. For example, it makes sense to activate the adaptive cornering light in the exterior mirror only below a threshold speed. Other environmental parameters that might be relied upon to activate the adaptive lighting include fog, rain, snow, sleet, cloudy or overcast conditions, and darkness or twilight. Other vehicle parameters that might be relied upon to activate the adaptive lighting include vehicle speed (below a threshold), steering angle (above a threshold), activation of turn indicator signaling an intentions to turn, and activation of daytime running light and/or headlights.

The lighting module 5 is controlled by means of a control module in the door or a controller in the exterior rearview device, which receives data via a bus system. Input data is fed into the control unit. Said input data includes vehicle data such as, for example, vehicle speed, steering wheel angle, and environmental data, such as road characteristics, illumination levels, weather, etc. The control unit then controls each of the adaptive light sectors Lx of the left and right lighting module, independently of each other, to turn on or off each of the LED light sectors and/or to vary their light intensity.

A useful control system is obtained, if the following vehicle parameters are met:
The vehicle is stationary or only moving at low speed, for example up to 30 km/h.
The turn signal is activated
And the running light is on.
The steering angle is greater than a threshold value.

This set of parameters defines a sharp turn at low speed in poor visibility and results in the adaptive cornering light being activated.

Figure 5:
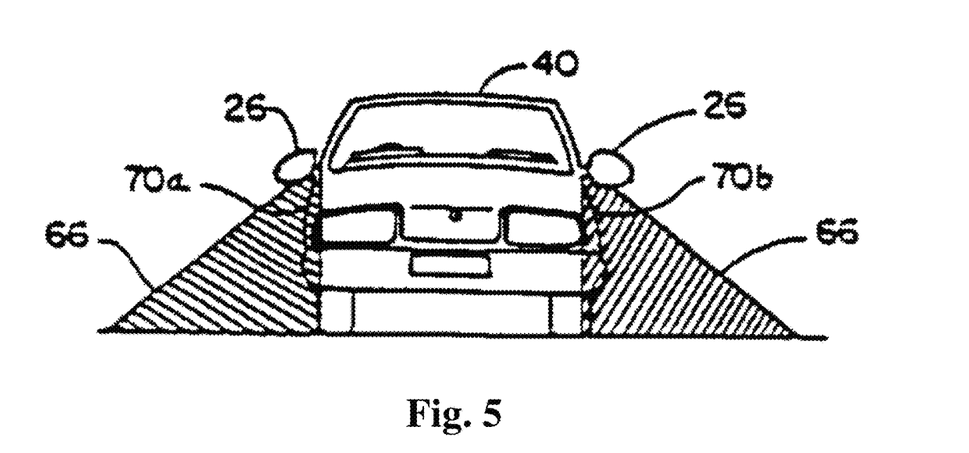
FIG. 5 illustrates an example embodiment of the illumination distribution areas of the security light according to the invention.

In an alternative embodiment, a security light function may be provided. A security light is also known in the literature as a "puddle light" and generally illuminates one or both sides (70a, 70b) of a vehicle 40 near the doors (see FIG. 5). Security lights have been provided in rearview mirrors 26 and are directed downwards and slight rearwards to illuminate an area 66 and the ground adjacent the side of the vehicle 40. Lighting sector L7 (not shown), may be disposed in the bottom side of a rearview device 3 and may be used to illuminate area 66. The lighting sector L7 may comprise one or more LEDs or light sources and the illumination may be diffused or directed by optical fibers, lenses, light guides, reflectors, etc. as with any of the other light sectors. In alternative embodiments, security lights may be installed in rocker panels, fenders, doors or other exterior locations of the vehicle.

Although the security light sector L7 is generally used when the vehicle is stationary, it may also be linked to the turn signal indicator in order to display an arrow or other warning signal along the ground adjacent the vehicle to signal to approaching vehicles or bicycles that the equipped vehicle is about to make a turn procedure. US 2005117364 describes a system for displaying arrows along the ground in cooperation with a turn signal to indicate that a turn is intended.

In an alternative embodiment, an interior lighting function may be provided by one or more light sectors L8. While it is possible that light sectors L8 may be housed in the rearview device 3, they may also be housed within the cabin or interior of the vehicle itself. Such interior light may be found in the interior of doors, along flooring or header materials, under the dashboard or under seating, or anywhere else within the interior of a vehicle. Interior lighting, if all associated with one lighting function (such as door opening) may be driven by one light source using optical fibers or light guides to direct the light to each of the output locations. This may have the advantages of reducing light intensity and simplifying maintenance of just a single light source.

In some embodiments, both the security lighting function L7 and the interior lighting function L8 may be "adaptive" to vehicle or environmental conditions. For example, upon sensing an entry remote within a defined proximity at night, a security light may automatically illuminate to direct the user to the vehicle for entry. Interior lighting may operate in a similar manner if desired. In some cases of security light sector L7, the illumination may contain a message such as an alert or warning. The message may be selected by a vehicle controller module based on environmental and/or vehicle status conditions. In this case, the message may include an alert such as a weather alert to advise the driver as to fog, snow, sleet, ice or other adverse or dangerous driving conditions. In other situations, the message may be a vehicle status alert such as one warning of low tire pressure or low oil or coolant levels, or a need for service. Alternatively, the message may be a logo or graphic design selected by the vehicle manufacturer or by the user. The use of images or messages displayed in the illumination area 66 may be accomplished by suitable light sources and patterns or masks that project the message or graphic to the ground area. Patent publications US2011/273671, US2010/253919, and EP2740632A1 illustrate and describe technology for displaying messages and logos by means of a lighting system such as described above for sector L7.

In other embodiments, the security light and/or the interior lights may be controlled and customized by the user. For example, the nature of the illumination (color, intensity, content, etc.) may be selected and/or customizable by the user of the vehicle. Some users may prefer red or blue (or any other color) illumination over amber or white. The message may be a greeting, such as "Hello" or "Welcome" and may even be customizable to include the user's name if desired. Whether a message is adaptive or user-controlled, it may be the same or different on each side of the vehicle.

In yet another embodiment, a lighting sector L9 may be used to display a message on a window or door area near the entry handle. Sector L9 may be used to display a message, much like that of the security light sector L7. However an alternative use of lighting sector L9 is to provide an identity confirmation prior to admitting the user. For this function, L9 may display a virtual key pad for the user to enter a passcode to unlock the vehicle. US 2006/614582 describes such a system. Lighting sector L9 may also be used to confirm identity through a "swipe pattern" as is common on smartphones, or through an image recognition system as is described in US2010/085147 or a gesture recognition. Finally, lighting sector L9 may be used to assess the sobriety of a user by means of a reflex test in which the user must, within a predetermined time limit, repeat a displayed pattern of lights, object or numerals, much like the Hasbro game "SIMON."

Figure 6:
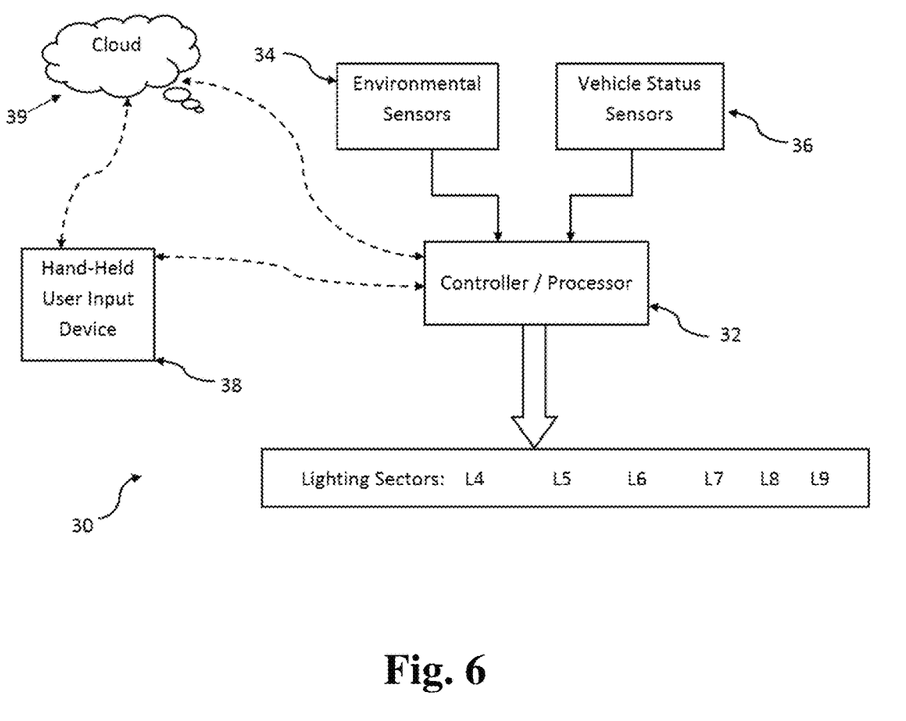
FIG. 6 illustrates a control system in schematic.

Customization and control of lighting functions (e.g. L7 and L8) may be accomplished by conventional controller electronics such as is currently employed by GM's "Onstar" and Verizon's "HUM" systems. These may use a plug in module or hard wired module having wireless transmitter and receiver functions for communicating with a hand-held user device, such as key fob or smartphone, for example. FIG. 6 illustrates a simple schematic for a representative control system 30. The brain of the control system is a computer controller or processor 32 that receives data inputs from the environmental sensors 34 and the vehicle sensors 36. As mentioned previously, the environmental sensors 34 detect conditions of light or darkness, rain, snow, fog, sleet, road conditions, proximity of a potential driver/user, or proximity an adjacent vehicle, etc. and feed this data to the controller 32. The vehicle sensors 36 detect status conditions of the vehicle itself, such as vehicle speed, steering angle, activation of lights (day time running or headlamp), activation of turn signal indicators, activation of hazard flasher lights, engine temperature, engine rpms, engine computer fault detections, oil pressure or life, tire pressure, etc. and feed these to the controller 32.

In the case of adaptive lighting controls, the processor uses this sensor input to determine which lighting sectors (L4 to L8) to activate, such as the adaptive cornering light sector L4 described above, the turn signal indicator light sector L5, the security light sector L7, or the interior lighting sector L8.

In the case of user customized lighting controls, the controller 32 may receive additional input signals from a remote, hand-held device 38 operated by the user. The hand-held user device 38 may be a smartphone having a suitable "app" or a remote key fob adapted to provide special inputs, such as by selecting a mode from a menu and then using up/down or right/left arrows to select the option for each mode, much like a certain camera menus. These control signals are shown in dashed lines in FIG. 6 to indicate that they are wirelessly conveyed, such as by a WiFi link or a Bluetooth™ technology. The user's hand-held device 38 may communicate directly with the receiver of the controller 32, or it may communicate with an application "in the cloud" 39 such as is done with "Onstar" or "Hum," and the "cloud" application then communicates with the controller 32 to deliver the signals.

As noted previously some of the user selected inputs may include any or all of the following:
Whether to enable of disable any particular feature or function;
Whether to display any message via a security light sector L7;
What message to display, in the event a message is selected;
What lighting characteristics (e.g. colors, shapes, and/or intensities) to use for both the interior lighting sector L8 and the security lighting sector L7.

The invention has been described above in in particular embodiments, the specifics of which should not be limiting to the invention as claimed in the appended claims. By this explicit reference, all patent publications cited by number and referenced herein are incorporated herein in their entirety, including description, claims, and drawings, as if set forth herein in their entirety.

What is claimed is:

1. A vehicle exterior rearview system comprising:
a housing adapted for mounting to an exterior side of a vehicle, the housing holding at least one of a reflective mirror surface and a display screen for displaying to a driver an image of the area to the side and rear of the vehicle;
one or more lighting modules disposed in and directly secured to said housing and providing at least one first lighting sector for implementing a turn-signal indicator and at least one second lighting sector for implementing additional illumination to the outside or inside of a vehicle, the second lighting sector being adaptively controlled; and
a control system for receiving input data concerning one or more of: (a) vehicle status parameters from vehicle status sensors, (b) the vehicle's environment conditions from environmental sensors; and (c) a user's intentions from a user input device; and for adaptively activating the second lighting sector in response to the input data.

2. The exterior rearview system according to claim 1, wherein at least one lighting module contains a plurality of LEDs for providing different lighting functions.

3. The exterior rearview system according to claim 1, wherein at least one lighting module contains a single light source and a light guide for directing light from the light source to one or more output points.

4. The exterior rearview system according to claim 1, further comprising light guides or optical fibers such that the illumination of a light source within the lighting module is directed via the light guides or optical fibers to multiple locations.

5. The exterior rearview system according to claim 1, wherein the second lighting sector is selected from an adaptive cornering light, an adaptive security light, and an adaptive interior light.

6. The exterior rearview system according to claim 1, wherein the second lighting sector is configured to display illumination in response to data input received by the control system, and wherein the illumination may optionally include a message or an alert.

7. The exterior rearview system according to claim 6, wherein the second lighting sector is an adaptive security light configured to display a message or an alert responsive to data input received from the vehicle status sensors.

8. The exterior rearview system according to claim 6, wherein the second lighting sector is an adaptive security light configured to display a message or an alert responsive to data input received from the environmental sensors.

9. The exterior rearview system according to claim 6, further comprising a user input device and wherein the second lighting sector displays illumination or a message responsive to data input received from the user input device.

10. The exterior rearview system according to claim 6, wherein control system controls at least one of color, shape, intensity, and timing of lights activated for the second light sector in response to user input.

11. The exterior rearview system according to claim 6, wherein control system further includes detection means for receiving from the environmental sensors input relating to the identity of a nearby user.

12. The exterior rearview system according to claim 11, wherein the input relating to the identity of a nearby user is selected from picture recognition, gesture recognition, key input recognition, and proximity of a detected user device.

13. The exterior rearview system according to claim 6, wherein control system further includes detection means for receiving from the environmental sensors input relating to road conditions or obstacles.

14. The exterior rearview system according to claim 1, wherein the control system activates the turn signal blinker light in addition to the second lighting sector light.

15. The exterior rearview system according to claim 1, wherein the second lighting sector is an adaptive cornering light, and wherein the control system activates the adaptive cornering light in response to steering angle input and vehicle speed input, whereby the cornering light is adaptively activated if the control system receives input data indicating that both: (i) the steering angle is greater than a threshold value, and (ii) the vehicle speed is below a threshold speed.

16. The exterior rearview system according to claim 1, further comprising a third lighting sector configured to project at least one arrow or chevron image onto the ground to the side of the vehicle and directed away therefrom, wherein the third lighting sector is operatively linked in the control system to activate in response to activation of the turn signal indicator function.

17. The exterior rearview system according to claim 1, further comprising a third lighting sector which is directed forward for providing a daytime running light function and is operatively linked in the control system.

18. A vehicle exterior rearview system comprising:
a housing adapted for mounting to an exterior side of a vehicle, the housing holding at least one of a reflective mirror surface and a display screen for displaying to a driver an image of the area to the side and rear of the vehicle;
one or more lighting modules disposed in and secured to said housing and providing at least one first lighting sector for implementing a turn-signal indicator and at least one second lighting sector for implementing additional illumination to the outside or inside of a vehicle, the second lighting sector being adaptively controlled; and
a control system for receiving input data concerning one of: (a) vehicle status parameters from vehicle status sensors or (b) the vehicle's environment conditions from environmental sensors; and adaptively activating the second lighting sector in response to the input data.

19. The vehicle exterior rearview system of claim 18 wherein, the second lighting sector illuminates inside the vehicle in response to the vehicle status sensor and illuminates inside and outside the vehicle in response to the environmental sensors.

20. A vehicle exterior rearview system comprising:
a housing adapted for mounting to an exterior side of a vehicle, the housing holding at least one of a reflective mirror surface and a display screen for displaying to a driver an image of the area to the side and rear of the vehicle;
one or more lighting modules disposed in and secured to said housing and providing at least one first lighting sector for implementing a turn-signal indicator and at least one second lighting sector for implementing additional illumination to the outside or inside of a vehicle, the second lighting sector configured to illuminate or display one of a message or an alert and being adaptively controlled; and
a control system for receiving input data concerning one or more of: (a) vehicle status parameters from vehicle status sensors, (b) the vehicle's environment conditions from environmental sensors; and (c) a user's intentions from a user input device; and for adaptively activating the second lighting sector in response to the input data.

21. The vehicle exterior rearview system of claim 20 wherein the input data is the detection of an entry remote within a defined proximity, and the second lighting sector displays a message in the form of a non-white, colored illumination upon sensing one of a low tire pressure, a low oil level, or a low coolant level.

* * * * *